US006587890B1

(12) United States Patent
Kult et al.

(10) Patent No.: US 6,587,890 B1
(45) Date of Patent: Jul. 1, 2003

(54) SWITCH CONTROLLER APPLICATION PROGRAMMER INTERFACE

(75) Inventors: George Kult, Fairfield, IA (US); Sharadha Vijay, Cedar Rapids, IA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/096,937

(22) Filed: Jun. 12, 1998

(51) Int. Cl.[7] .................................................. G06F 9/54
(52) U.S. Cl. ...................................... 709/328; 379/242
(58) Field of Search ................................ 709/310–320, 709/328; 379/242–248

(56) References Cited

U.S. PATENT DOCUMENTS

| | | | |
|---|---|---|---|
| 4,232,199 A | 11/1980 | Boatwright et al. | 379/197 |
| 4,577,061 A | 3/1986 | Katzeff et al. | 379/144.01 |
| 4,611,096 A | 9/1986 | Asmuth et al. | 379/201.02 |
| 4,625,081 A | 11/1986 | Lotito et al. | 379/88.26 |
| 4,685,127 A | 8/1987 | Miller et al. | 379/221.02 |
| 4,706,275 A | 11/1987 | Kamil et al. | 379/114.2 |
| 4,782,519 A | 11/1988 | Patel et al. | 379/201.05 |

(List continued on next page.)

FOREIGN PATENT DOCUMENTS

WO    WO/91/16779    10/1991    ............ H04M/1/66

OTHER PUBLICATIONS

"Gazing into the SPC network future reveals vista of new features," Gordon and Hodges, Telephony Magazine, Mar. 21, 1983.

(List continued on next page.)

*Primary Examiner*—St. John Courtenay, III

(57) ABSTRACT

Switch controller application programmer interfaces (SCAPIs) are described herein. The SCAPIs allow for communication with routines of an application program that resides in memory of a switch controller. The switch controller is a component within a telecommunications network that provides an interface between a public switched telephone network via programmable switches and intelligent service network components. Intelligent service network components may provide an interface to other networks and/or perform enhanced service call processing. Functions performed using SCAPI procedures include interface with the programmable switches, health monitoring, requesting processes to perform tasks, interface with intelligent service network components, and enhanced service call processing. SCAPIs are procedures that reside in memory of the switch controller and, when performed by processing computer program commands, cause SCAPI messages to be sent that provide communication with routines within the switch controller application program.

30 Claims, 8 Drawing Sheets

U.S. PATENT DOCUMENTS

| | | | |
|---|---|---|---|
| 4,791,640 A | 12/1988 | Sand et al. | 370/384 |
| 4,893,330 A | 1/1990 | Franco | 379/91.02 |
| 4,928,304 A | 5/1990 | Sakai | 379/93.14 |
| 5,068,891 A | 11/1991 | Marshall | 379/91.02 |
| 5,222,120 A | 6/1993 | McLeod et al. | 379/88.24 |
| 5,452,350 A | 9/1995 | Reynolds et al. | 379/221.07 |
| 5,541,917 A | 7/1996 | Farris | 370/352 |
| 5,544,163 A | 8/1996 | Madonna | |
| 5,590,181 A | 12/1996 | Hogan et al. | 379/114.14 |
| 5,640,446 A * | 6/1997 | Everett et al. | 379/115 |
| 5,673,299 A | 9/1997 | Fuller et al. | 379/210.03 |
| 5,706,437 A | 1/1998 | Kirchner et al. | |
| 5,790,173 A | 8/1998 | Strauss et al. | 725/114 |
| 5,825,857 A | 10/1998 | Reto et al. | 379/114.15 |
| 5,826,030 A | 10/1998 | Herbert | |
| 5,912,961 A | 6/1999 | Taylor et al. | 379/221.11 |
| 5,920,621 A | 7/1999 | Gottlieb | 379/112.01 |
| 5,937,042 A | 8/1999 | Sofman | 379/112.05 |
| 6,058,181 A | 5/2000 | Hebert | 379/242 |
| 6,088,749 A * | 7/2000 | Hebert et al. | 710/105 |
| 6,108,337 A | 8/2000 | Sherman et al. | |
| 6,119,187 A * | 9/2000 | Hebert | 710/105 |
| 6,188,761 B1 | 2/2001 | Dickerman et al. | |
| 2001/0016038 A1 | 8/2001 | Sammon et al. | 379/202.01 |

OTHER PUBLICATIONS

"Signaling System 7 Rescues antiquated billing system," Jonelit Telephony Magazine, Dec. 1984.

"Smart Credit Cards: the answer to cashless shopping," Weinstein, IEEE Spectrum, Feb. 1984.

"Excel Switching", electronic brochure, www.xl.com/prod.htm.

"VCO Open Programmable Switches," electronic brochure, www.summa4.com/products/wpswitch.htm.

"The Centrex Call Center Advantage," electronic brochure, www.nortel.com/pen/solutions/acd.html.

"Centrex Call Center Tailoring for your Business", electronic brochure, www.nortel.com/pen/solutions/tailoring.html.

"Centrex CTI", electronic brochure, www.nortel.com/pen/solutions/cti.html.

"Centrex Call Center Reporting Options," electronic brochure, www.nortel.com/pen/solutions/reporting.html.

"Quick Product Index," electronic brochure, www.nortel.com/home/quick/#A.

Newton, H., "Newton's Telecom Dictionary", Flatiron Publishing, Copyright Mar. 1998, $14^{th}$ Edition, p. 370.

* cited by examiner

Intelligent Service Network Messaging Interface

SCAPI Switch Message Data Portion 528

| Message Type | Version | Switch Type | Switch Identifier | Message Options | Context | Status | Data Encoding | Data Format | Data Size |
|---|---|---|---|---|---|---|---|---|---|
| 602 | 604 | 606 | 608 | 610 | 612 | 614 | 616 | 618 | 620 |

FIG. 6A

SCAPI Registration Message Data Portion 530

| Message Type | Version | Registration Options | Context | Status | Data Format | Data Size |
|---|---|---|---|---|---|---|
| 622 | 624 | 626 | 628 | 630 | 632 | 634 |

FIG. 6B

SCAPI Control Message Data Portion 532

| Message Type | Version | Operation Code | Context | Status | Data Format | Data Size |
|---|---|---|---|---|---|---|
| 636 | 638 | 640 | 642 | 644 | 646 | 648 |

FIG. 6C

SCAPI Service Message Data Portion 534

| Message Type | Version | Service Type | Call Identifier | Agent Terminal Identifier | Leg Identifier | Context | Status | Status Qualifier | Data Format | Data Size |
|---|---|---|---|---|---|---|---|---|---|---|
| 650 | 652 | 654 | 656 | 658 | 660 | 662 | 664 | 666 | 668 | 670 |

FIG. 6D

SWITCH CONTROLLER APPLICATION PROGRAMMER INTERFACE

BACKGROUND OF THE INVENTION

1. Field of the Invention

The present invention relates generally to communication among routines within and among computer programs.

2. Related Art

Application programmer interfaces (APIs) are procedures for computer program communication. During processing of a routine of a computer program, communication is needed with other routines within the computer program and with routines of other computer programs. In order to communicate, a routine of a computer program retrieves the API procedures stored in memory and processes the API which results in the desired communication.

A computer program, which may also be referred to as an application program, typically resides in memory of a computer, also referred to as a computer system. The computer has memory, which is hardware capable of storing digital data, and, a processor, which is connected to the memory and is capable of processing instructions or procedures stored in digital format. The computer program is processed by the processor within the computer system. A computer program has multiple routines which may also be referred to as components or elements. The various routines of the computer program need to communicate in order to process the computer program and perform the desired function.

Exemplary APIs are those used by the Excel programmable switch described in a document entitled Excel API specification revision 5.0. The APIs within the Excel programmable switch enable communication with external telecommunication network components and complete call processing via a telecommunications network. The programmable switch is a component in a telecommunications network that can accept a call from a telephone circuit, accept commands for processing the call, and switch the call by interconnecting two channels on a switch matrix within the programmable switch. The Excel programmable switch APIs provide the procedures needed to perform call processing functions.

Although the programmable switch can perform basic switching based on commands from an external telecommunications network component, the programmable switch is not capable of performing complex call processing needed to handle service specific features of many enhanced telecommunications services. Similarly, the Excel programmable API is also not capable of performing complex call processing needed to handle service specific features of enhanced telecommunications services.

SUMMARY OF THE INVENTION

A switch controller is a telecommunications network component which controls operation of one or more programmable switches and is capable of performing complex call processing to handle service specific features of enhanced telecommunications services. The switch controller provides an interface between the public switching telephone network (PSTN) and an intelligent service network (ISN). The ISN includes components which perform enhanced call handling capabilities, such as operator consoles and automated response units, and components that provide access to databases and other networks. Exemplary call processing functions performed by the switch controller to provide enhanced call service capability include group selecting, call queuing, and processing of prepaid call billing. Enhanced services, such as pre-paid service, calling card, operator service, 1-800-COLLECT, and 1-800-MUSIC-NOW are implemented using the switch controller.

The switch controller has generic application programmer interfaces (APIs) which allow communication between the switch controller application program routines. Switch controller APIs (SCAPIs) provide procedures for switch controller communication to provide control commands to programmable switches, interface to the ISN, and perform call processing functions necessary for enhanced service call processing. The switch controller performs conversion between the SCAPIs and the programmable switch APIs. In addition, the switch controller performs conversion between the SCAPIs and network information distribution service (NIDS) sequenced packet protocol (NSPP) which rides on top of user datagram protocol/internet protocol (UDP/IP) used by the ISN. The NSPP is a session-oriented, guaranteed-delivery packet exchange protocol which provides fast communications with client-server programs which use UDP/IP.

The SCAPIs are generic in that they are unique and are not affected by changes to other APIs or messaging techniques, such as the Excel programmable switch APIs or changes to ISN NSPP and UDP/IP protocols. Having a generic SCAPI provides various benefits, including flexibility and extensibility. Flexibility is possible because the SCAPIs are independent of the programmable switch APIs and the ISN protocols. The programmable switch APIs and the ISN protocols do not need to be upgraded with changes to the SCAPIs. Likewise, the SCAPIs do not need to be upgraded with the changes to the programmable switch APIs the ISN protocols. Therefore, changes can be more readily made to the programmable switches, switch controller, and ISN that require changes to the respective APIs and protocols.

In addition, extensibility is improved with generic SCAPIs because new services can be more easily implemented. New services can be more easily implemented because modifications are not needed to the programmable switch, switch controller, and ISN for communication between these components. Modifications are needed only to telecommunications network components directly impacted by the changes required to implement the new service. For example, if a new operator service feature is added to the ISN, only the ISN and possibly the switch controller are impacted. Modifications are not needed to the programable switch. Likewise, if Excel changes the programmable switch APIs, the change can be accommodated by changing one routine of the switch controller that performs conversion between the programmable switch APIs and the SCAPIs.

To accommodate enhanced services, the SCAPIs perform various functions. The SCAPIs provide procedures for accepting messages from and sending messages to the programmable switch in programmable switch API format. In addition, the SCAPIs provide procedures for interprocess registration. Interprocess registration is registration by a routine within a computer program with another routine within the computer program. Also, the SCAPIs are capable of controlling the switch controllers or telecommunications network components interfering with the switch controller, such as standalone personal computer (pc) systems, by allowing interprocess requests to perform tasks. Furthermore, the SCAPIs provide procedures to communicate call processing related information and requests to perform call processing functions.

These functions are performed by various types of SCAPIs. Four types of SCAPIs are switch SCAPIs, registration SCAPIs, control SCAPIs, and service SCAPIs. Switch SCAPIs allow the switch controller to interface with the programmable switch. Registration SCAPIs allow the switch controller processes to register themselves with other processes. Control SCAPIs request a process to perform a task. Service SCAPIs request call processing related services.

The SCAPIs are stored in the main memory and processed by the processor of a computer. In order to process the SCAPI, the processor calls the SCAPI procedure from main memory. The SCAPI procedure includes sending a SCAPI message comprising data from one routine to another and receiving a response. The SCAPI message includes input data, which is data included in the initial the SCAPI message. The SCAPI message causes the recipient routine to perform an action using the input data and provide a response SCAPI message. The response SCAPI message includes return data which is data included in the response message providing data requested and/or indicating whether the transaction was successful. In addition, the SCAPI message may provide output data which is data requested by the initiating routine. The SCAPI response messages are not required but are useful in ensuring that a transaction is completed successfully.

Because there are various different types of SCAPI messages, a message descriptor indicating the message type and other information about the message precedes the message. The message descriptor describes the message characteristics and allows the SCAPIs to behave in a consistent manner for all SCAPI types.

Further features and advantages of the invention, as well as the structure and operation of various embodiments of the invention, are described in detail below with reference to the accompanying drawings.

BRIEF DESCRIPTION OF THE FIGURES

The present invention is described with reference to the accompanying drawings, wherein:

FIG. 6A is a diagram of the SCAPI switch message data portion according to one embodiment of the present invention;

FIG. 6B is a diagram of the SCAPI registration message data portion according to one embodiment of the present invention;

FIG. 6C is a diagram of the SCAPI control message data portion according to one embodiment of the present invention; and FIG. 6D is a diagram of the SCAPI service message data portion according to one embodiment of the present invention.

In the drawings, like reference numbers generally indicate identical, functionally similar, and/or structurally similar elements. The drawing in which an element first appears is indicated by the left-most digits in the corresponding reference number.

Figure 1A:
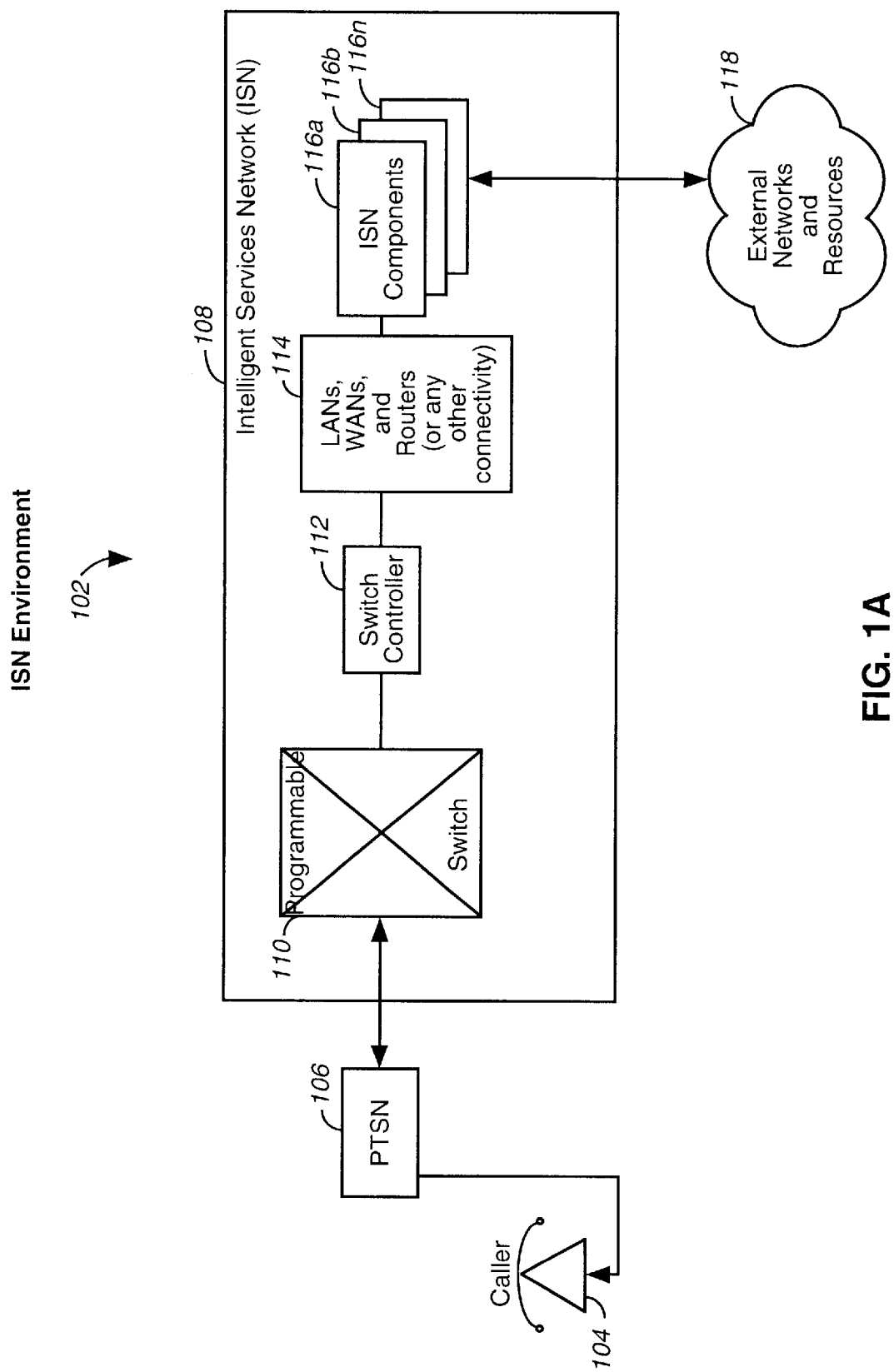
FIG. 1A is a block diagram of an intelligent service network (ISN) environment, according to one embodiment of the present invention.

DETAILED DESCRIPTION OF THE PREFERRED EMBODIMENTS 1.0 Overview

Switch controller application programmer interfaces (SCAPIs) produce SCAPI messages that are sent between software routines within a switch controller in order to provide control commands to programmable switches, interface to an intelligent service network (ISN), and perform call processing functions necessary for enhanced service call processing. The switch controller provides an interface between the public switch telephone network (PSTN) and an ISN. The ISN provides specialized call handling for enhanced services such as operator services, 1-800-COLLECT, and 1-800-MUSICNOW. In addition, the ISN provides access to databases and other networks.

In addition, the switch controller provides an interface between the PSTN via a programmable switch and the ISN by converting between a SCAPI message format and a programmable switch API format. Likewise, the switch controller converts between the SCAPI message format and an ISN protocol format. An exemplary ISN protocol is the network information distribution service (NIDS) sequenced packet protocol (NSPP) which rides on top of user datagram protocol/-internet protocol (UDP/IP).

The SCAPI is capable of providing communication between five switch controller software routines. The switch controller software routines include the programmable switch support function, the call control function, the service control function, the resource control function, and the management interface function. The programmable switch support function provides an interface between the switch controller and the programmable switch. The call control function establishes connections between an originating party and a terminating party in a service-independent manner. The resource control function includes a subroutine which monitors the states of a call and service-related resources and a resource management subroutine described in further detail in copending U.S. patent application Ser. No. 09/096,939 entitled, "A System and Method for Resource Management," which is incorporated herein by reference in its entirety. The service control function is made up of the switch service process, which provides an interface to the ISN, the group select process, the call queuing process, the prepaid service logic process, and other service logic programs. The system management interface function includes two main functional areas of monitoring control: system alarms and process management. The switch controller and switch controller software routines are described in further detail in copending U.S. Pat. No. 6,480,597 entitled, "Switch Controller," incorporated by reference herein in its entirety.

Four types of SCAPI messages provide communications between the five switch controller software routines. The programmable switch support function interprets programmable switch API messages and communicates with the other switch controller routines to provide information received from the programmable switches. The programmable switch support function also provides commands to the programmable switches that cause announcements to be played, attach receivers that receive signals, such as dual tone multifrequency (DTMF) signal receivers, and control channels. Registration SCAPI messages are used by the various processes to register themselves and provide health monitoring information, such as heartbeats. Control SCAPI messages request another switch controller process to perform a task, such as managing a Simple Network Management Protocol (SNMP) agent. A SNMP agent is within the switch controller and communicates with a System Management Console, which can control the switch controller, using SNMP. Service SCAPI messages are used by switch controller processes to request call related services from other switch controller processes.

The SCAPIs use UNIX interprocess communication (IPC) capabilities in order to send SCAPI messages. The initiating process sends the SCAPI message to the desired recipient routine within the computer program of the switch controller application program. The message is received in the recipient routine's IPC message queue. Queues are software mechanisms for queuing messages until a particular software routine is able to accept and process the message. The IPC message queue includes a reference pointer to shared memory. The shared memory is dynamically allocated to include the data that was transferred in the SCAPI message. The recipient routine can retrieve the data included in the message and processes the request.

2.0 Terminology

Provided below is a brief description of the terminology used within this document. Additional description is provided in the following sections, along with exemplary implementations and embodiments. However, the present invention is not limited to the exemplary implementations and embodiments provided.

A "computer," which may also be referred to as "a computer system," includes one or more processors which are connected to a bus and memory. A computer may include any connectivity between the processor and one or more memory devices, and is not limited to a bus. "Memory" may be main memory, preferably random access memory, and/or secondary storage devices. "Secondary storage devices" include, for example, a hard drive, and a removable storage medium drive such as a disk drive, or a CD, for example.

A "computer program," also referred to as an "application program" or "application computer program," resides in main memory while executing. When executing, the computer program enables the computer system, or computer; to perform features of the present invention.

"Software routines," also referred to as "functions" and "processes" are elements of the computer program or application program. Software routines are sub-sets of a computer program or application program, such as groups of lines of code, that perform one or more functions. A computer program may have one or more software routines. Software routines are processed during processing of the computer program if they are required for processing of the computer program, specified by another routine or by an operator, result from other processing of the computer program, or initiated in some other way.

An "application programmer interface (API)" allows software routines to interface with one another in a consistent and coordinated manner. An "API" is a set of procedures established in software, such as in lines of code, that provide interprocess communication. The APIs may provide interprocess communication by sending and receiving messages according to specified formats. A "switch controller application programmer interface (SCAPI)" is an API that allows software routines within a switch controller to interface with one another.

An API may allow for interprocess communication by sending and receiving messages. "Switch messages" allow communication with a programmable switch. "Registration messages" are used by processes to register themselves with other processes. "Control messages" request a process to perform a task. "Service messages" request call processing related services.

3.0 Exemplary ISN Environment

FIG. 1A is a block diagram of an intelligent service network (ISN) interface environment 102 according to one embodiment of the present invention. The ISN environment 102 includes telephone 104 used by a caller, a public switch telephone network (PSTN) 106, an ISN 108, and external networks and resources 118. The telephone 104 used by the caller is connected to PSTN 106. The PSTN 106 provides switching and connectivity to the ISN 108. One or more ISN components 116, such as ISN component 116n, of ISN 108 are connected to external networks and resources 118. External networks and resources 108 include financial processors, information databases, and Internet facilities. In addition to providing connectivity to external networks and resources 118, the ISN components 116 provide enhanced service call processing. Enhanced services include manual operator service, prepaid calling, calling card, 1-800-COLLECT, and 1-800-MUSICNOW.

The switch controller 112 within the ISN 108 provides access for a call initiated via PSTN 106 to ISN components 116a, 116b, . . . 116n (116) also within ISN 108. Switch controller application programmer interfaces (SCAPIs) provide interprocess communication for the switch controller 112. The ISN 108 is described in further detail in copending U.S. patent application Ser. No. 09/096,936 entitled, "Intelligent Service Network," incorporated by reference herein.

The ISN 108 includes a programmable switch 110, a switch controller 112, LANs, WANs, and routers (or any other connectivity) 114, and ISN components 116. The programmable switch 110 is connected to the PSTN 106 to provide switching capabilities for access to the ISN 108. The switch controller 112 is interconnected to programmable switch 110 to provide commands to control the programmable switch 110. The LANs, WANs, and routers (or any other connectivity) 114 are connected to switch controller 112 and the ISN components 116 to provide connectivity between the switch controller 112 and the ISN components 116. Exemplary ISN components 116 include manual telephone operator consoles (MTOCs), automated response units (ARUs), databases, and protocol converters. The MTOCs and ARUs are personal computers (PCS) that interact with a caller to provide operator services, customer services, and other enhanced services. Databases include stored information and may be a single database or multiple databases connected to and controlled by a server systems. Protocol converters are connected to external networks and resources 118 and provide protocol conversion and other processing necessary for interface between the PSTN 106 and external networks and resources 118.

The interface environment of the ISN 102 can best be described referencing the processing of a typical call. The exemplary call will be for a service that requires human operator intervention. The call is placed by a caller using telephone 104. The call is received by PSTN 106. The PSTN 106 comprises multiple telecommunications networks including local exchange networks and interexchange networks. A local exchange network comprises switches and termination equipment within a localized area. An example of a local exchange network is a local telephone operating company network, such as Bell Atlantic. An interexchange network comprises a plurality of switches, also referred to as exchanges, distributed throughout a geographic area large enough to process long distance telephone calls. For example, a national interexchange network comprises switches located throughout the nation. When the call is routed to either a local exchange network or an interexchange network, the call is routed to one or more switches within the network.

The PSTN 106 is interconnected to the programmable switch 110 within the ISN 108. The programmable switch 110 has a basic switching matrix that provides switching functionality for access to the ISN 108. An ISN 108 may include additional programmable switches (not shown) interconnected to switch controller 112 or to additional switch controllers (not shown). The programmable switch is a dumb switch that can connect ports and process calls based on external commands. Examples of programmable switches include those built by Excel and Summa Four. Excel programmable switches come in a variety of sizes to satisfy many different port requirements.

The ISN 108 has a sizable architecture because the number of programmable switches 110 and the configuration of the programmable switches 110 can vary depending on the desired port requirement of the ISN 108. Excel programmable switches can support various signaling systems such as Signaling System Number 7 (SS7) and can be connected directly to the signaling network of a PSTN 106. If multiple programmable switches are interconnected to one or more switch controllers, connections between the programmable switches and the switch controllers are most likely via a LAN (not shown), such as an Ethernet LAN, using transmission control protocol/internet protocol (TCP/IP). The TCP/IP is used by various data networks including many Internet servers.

Each programmable switch 110 is connected to the PSTN 106 via voice telephony trunks, also referred to as lines. Typical telephony trunks are capable of carrying high speed digital data. The voice trunk connectivity between the programmable switch 110 and the PSTN 106 includes signaling, such as SS7 protocol. The current industry standard of SS7 protocol is published in the International Telecommunications Union (ITU) Signaling System Number 7 (SS7) Integrated Services Digital Network (ISDN) User Part (ISUP) NCT1.113 (1995) document and the International Telecommunications Union (ITU) Signaling System 7 (SS7) Message Transfer Part (MTP) NCT 1.111 (1992) document which are incorporated herein by reference in their entirety. The SS7 protocol may be implemented using SS7 signaling rings (not shown) connected to a signal transfer point (not shown). Some ISN 108 architectures may use signaling gateways between the signaling transfer point and the programmable switch although this is not necessary if the programmable switch is capable of the signaling used by the PSTN 106.

Switch controller 112 is connected to programmable switch 110 to provide external commands to control call processing. The switch controller 112 provides the commands to the programmable switch to perform call processing functions. When the programmable switch 110 receives a call from the network it sends a message to the switch controller 112. The switch controller 112 determines the call processing needed and returns commands to the programmable switch 110.

In addition, the switch controller 112 provides access to ISN components 116. The switch controller 112 interfaces with ISN components 116 via LANs, WANs, routers (or any other connectivity) 114 using Network Information Distribution System (NIDS) Sequenced Packet Protocol (NSPP) on top of User Datagram Protocol/Internet Protocol (UDP/IP). The NSPP is a session oriented packet exchange protocol that is implemented over UDP/IP. It is designed to allow rapid information exchange between client applications and NIDS server processes. The use of TCP/IP between switch controller 112 and the programmable switch 110 and the use of NSPP/UDP/IP for communications via LANs, WANs, routers (or any other connectivity) 114 illustrate exemplary protocols but the ISN 108 is not limited to these protocols.

ISN components 116 include components that provide enhanced service functionality call and connectivity to external networks and sources 118. One example is a MTOC. A MTOC is PC workstation that is operated by a live operator or call center agent to provide operator services, customer services, and other enhanced services requiring human operator intervention. Another example of an ISN component 116 is an ARU. An ARU is comprised of a network audio server (NAS) and an automated call processor (ACP). An ARU is used to provide automated operator services and interactive voice response services. The ACP is a high performance personal or midrange computer that performs intelligent application processing to determine which services to provide. The NAS is a specialized computer equipped with telephony ports which provides audio responses and collects caller input via dual tone multifrequency (DTMF) signals and voice recognition based on commands provided by the ACP. The ACPs communicate with the NASs via LANs, WANs, and routers (or any other connectivity) 114. Each ARU/NAS and MTOC is connected to one or more programmable switches via voice trunks (not shown). Both MTOCs and ARUs are also referred to as agents.

An additional example of an ISN component 116 is a NIDS server and database. A NIDS server and database stores data related to call processing such as customer accounts and routing translations. When an ISN component, such as an ARU or a MTOC, receives a call, it may query a NIDS server for data stored in the NIDS database. The NIDS servers receive data from mainframe-based systems to be used during real time call processing. Order entry and data management functions are performed within mainframe based systems. Mainframe computers are used as the databases of record for call processing data. A data distribution system (DDS) distributes the call processing data stored in the mainframe computers over a token ring LAN to each NIDS server.

The ISN components 116 also include protocol converters that convert between various telecommunications protocols. Protocol converters provide protocol conversion between different protocols such as TCP/IP, NSPP on top of UDP/IP, and packet switching protocols, such as X.25. Exemplary components that perform protocol conversion are described in U.S. Pat. No. 6,229,819 entitled, "Advanced Intelligent Network Gateway" and U.S. Pat. No. 6,160,874 entitled, "Validation Gateway," both of which are incorporated herein by reference in their entirety. Additional ISN components 116 are described in copending U.S. Pat. No. 6,188,761 entitled, "A System and Method for Providing Operator and Customer Services for Intelligent Overlay Networks," which is also incorporated herein by reference in its entirety. The capabilities of the components described in the previously referenced applications are not limited by the examples given and are defined by the scope of the claims in the applications.

Additional ISN components 116 include standalone PC workstations for system management, force management and configuration provisioning.

The ISN components 116 are connected to external networks and resources 118. Exemplary external networks and resources 118 include financial processors with credit card information, the Internet, and other databases, such as those used in processing international calls.

Figure 1B:
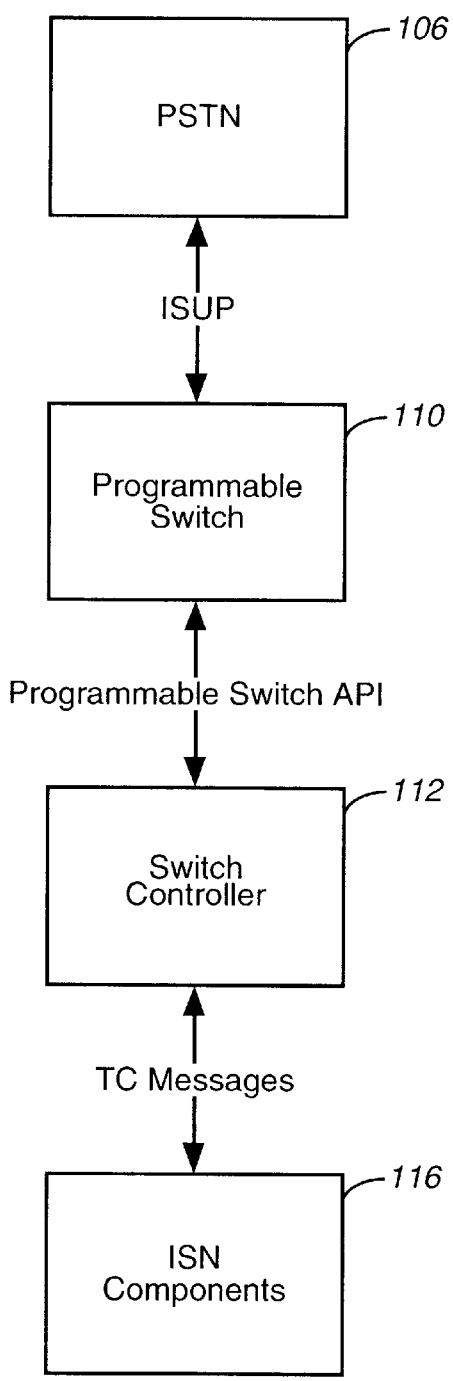
FIG. 1B is a block diagram of an intelligent service network (ISN) messaging interface, according to one embodiment of the present invention.

FIG. 1B is a block diagram of the ISN message interface 150. The ISN message interface 150 illustrates the external interfaces of the switch controller 112. The switch controller 112 communicates with the programmable switch 110 via TCP/IP over either a direct cable connection or a LAN (not shown). The switch controller sends messages in an application programmer interface (API) messaging format that is specified by the programmable switch 110 vendor. For example, if an Excel programmable switch is used, then an Excel API is used. The Excel programmable switch API is described in a document entitled, "Excel API specification revision 5.0."

The programmable switch 110 uses ISUP messaging in communications with the PSTN 106. The ISUP messaging is part of SS7, and references a layer of SS7 messaging used to perform ISN type services. The ISUP messages are used to trigger call state changes which are used to set-up a call.

The switch controller 112 controls functions needed for call set-up including performing call processing and allocating facilities, such as programmable switch 110 channels and ports and ISN components 116. Exemplary ISUP messages used in call processing are included in Table 1 below.

TABLE 1

ISUP Messages Sent Between the Programmable Switch and the Switch Controller

| Abbreviation | Message Name | Description |
|---|---|---|
| IAM | Initial Address Message | The Initial Address Message includes the digits identifying the called and calling parties, the type of network connection required, the characteristics of the calling party (payphone, etc.), and the characteristics of the call type (voice, data, fax, etc.). For inbound calls, the switch controller is mainly concerned with the called and calling party numbers which identify the product and operator group required to support the call. |
| ACM | Address Complete Message | The Address Complete Message includes the backwards acknowledgment through the network that the requested facilities in the IAM have been provided and where compromises were made (satellite hops, etc.). Additionally, the ACM indicates to the intermediate nodes that voice should be provided in the backwards direction of the call. |
| ANM | Answer Message | The Answer Message indicates that the call has been answered by the called party and indicates to the intermediate nodes that two way voice path should be provided. |
| REL | Release Message | The Release message indicates that one party in the call has requested to release the connection. Additionally, the REL message may contain various cause codes which indicate the reason for the termination of the call (normal and many possible abnormal conditions). |
| RLC | Release Complete | The Release Complete message indicates that a request for REL is granted from the previous nodes in the call and that the resources assigned to the call shall be released. |
| SUS | Suspend Message | The suspend message indicates temporary suspension of an active call. |
| RES | Resume Message | Follows a suspend message to indicate that suspended call is resumed. |

Note, however, that the present invention can also be implemented using ISDN messaging. Reference, for example, can be made to "Digital Subscribers Signaling System No. 1—ISDN User-Network Interface Layer 3 Specification For Basic Call Control," ITU_T Recommendation Q.931. In fact, any known or future developed messaging protocol can be used to implement the present invention.

The switch controller 112 communicates with each ISN component 116 via NSPP/UDP/IP over the ISN Ethernet LAN 214. The NSPP messaging is used to implement an API referred to as transmission control (TC) messaging. The TC messages include messages needed for communication between the switch controller 112 and the various ISN components 116 to handle a call. For example, for a switch controller 112 to route a call to a particular ARU 204 port, the switch controller 112 sends a "Call Offered" TC message to that ARU 204. The messages that are part of the TC API are included in Table 2 below.

TABLE 2

TC Messages

| TC Message | Message initiating component → message reviewing component | Description |
| --- | --- | --- |
| TC_Call Offered | Switch Controller → MTOC/ACP | New Call offered to the platform |
| TC_Release | MTOC/ACP → Switch Controller | To release a call leg |
| TC_Conference | MTOC/ACP → Switch Controller | Conference in a terminating party |
| TC_Call Park | MTOC/ACP → Switch Controller | Park an active call and start call park time |
| TC_Count | MTOC/ACP → Switch Controller | Connect an originator and terminator and drop off operator |
| TC_Logon | MTOC/ACP → Switch Controller | Logon an Operator |
| TC_Layoff | MTOC/ACP → Switch Controller | Logoff an operator |
| TC_Update | MTOC/ACP → Switch Controller | Update status of Operator (Ready/Not Ready) |
| TC_On_Hold | MTOC → Switch Controller | Hold the specified leg (on and off hold) |
| TC_Off_Hold | MTOC → Switch Controller | Take a leg off hold |
| TC_Answer | Switch/Controller → ACP/MTOC | Answer indication from the terminating party |
| TC_Observe | Supervisor Console → Switch Controller | To observe a specific operator |

4.0 SCAPIs within the Switch Controller

Figure 2:
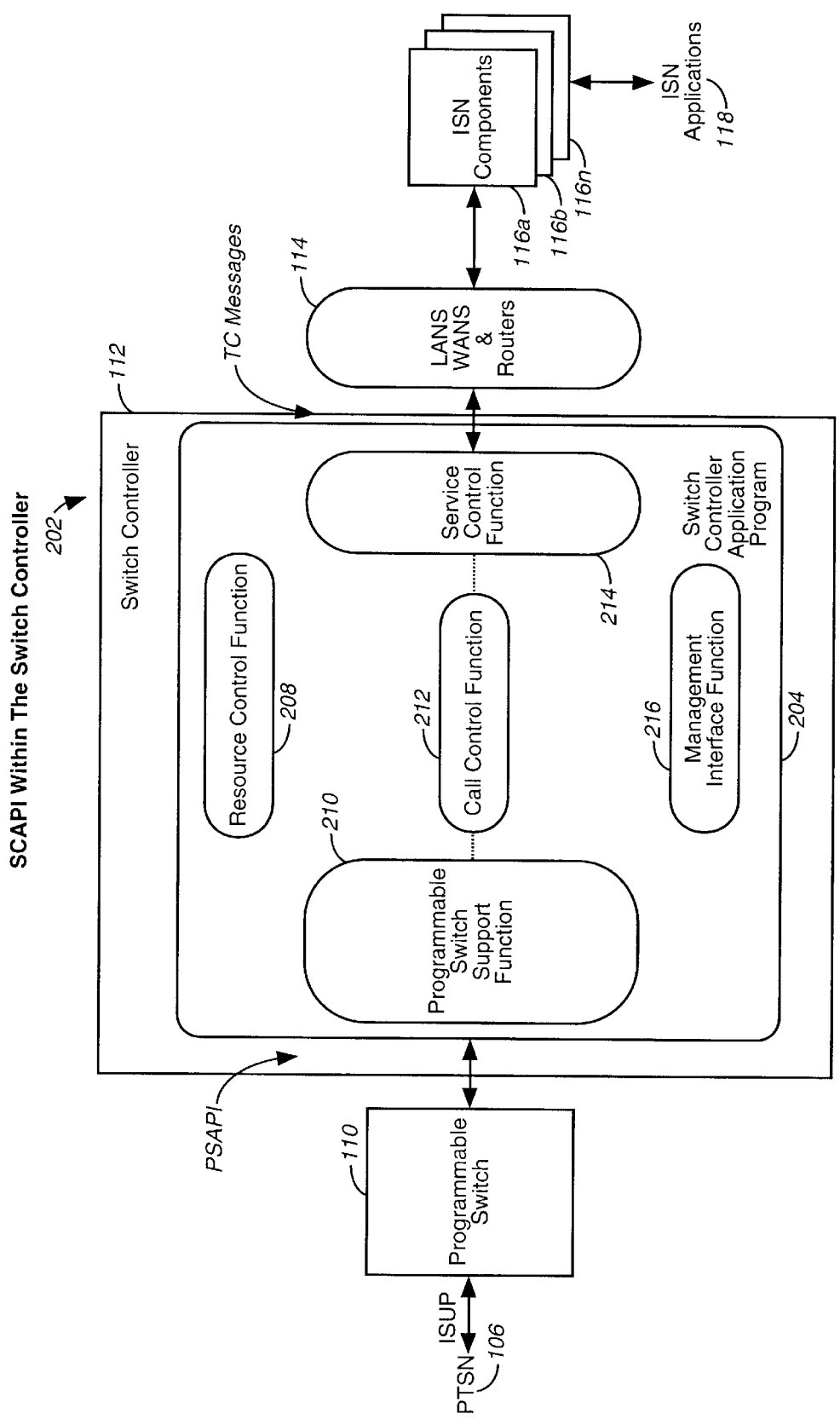
FIG. 2 is a block diagram of the switch control application within the switch controller, according to one embodiment of the present invention.

FIG. 2 is a block diagram 202 of the switch controller application program within the switch controller according to one embodiment of the present invention. Stored within memory of the switch controller 112 is the switch controller application program 204 which is the computer program that performs the functionality associated with switch controller 112. The architecture of the switch controller 112 will be described in further detail with respect to FIG. 3. The processing of SCAPI messages within the switch controller 112 will be described in further detail with respect to FIG. 4.

The SCAPIs provide communication between the routines within the switch controller application program 204. SCAPIs provide this communication by sending SCAPI messages. The SCAPIs are stored in the main memory and processed by the processor of the switch controller 112. In order to process a SCAPI, a processor within the switch controller 112 calls the SCAPI procedure from main memory. The SCAPI procedure sends a SCAPI message comprising data from one routine to another and receives a response. The SCAPI message includes input data, which is data that will be used to perform an action. An example of input data is a call identifier that can be used to retrieve statistics about a particular call. The SCAPI message causes the recipient routine to perform an action using the input data and provide a response SCAPI message. The response SCAPI message includes return data which is data requested and/or data indicating whether the transaction was successful. In addition, the SCAPI message may provide output data which is data requested by the initiating routine. The SCAPI response messages are not required but are useful in ensuring that a transaction is completed successfully.

The SCAPI communication between the routines within the switch controller application program 204 allows the switch controller 112 to perform call processing functions, interface with the programmable switch 110, and interface with ISN components 116. The routines within the switch controller application program 204 include the programmable switch support function 210, the call control function 212, the service control function 214, the resource control function 208, and the management interface function 216.

The programmable switch support function 210 provides an interface between the switch controller 112 and the programmable switch 110. The programmable switch support function 210 translates messages between generic SCAPI message format and programmable switch API message format, manages message header/trailer requirements, and controls connectivity to the programmable switch.

The call control function 212 provides service independent call processing. The call control function 212 performs call processing by analyzing call processing information with respect to the current state as defined by the basic call state machine model. Each call has two states represented in the state machine for the originating and terminating call segments. The basic call state machine model is described further in the International Telecommunications Union (ITU) specifications Q.1224. The call control function 212 performs various functions including but not limited to: detecting an incoming call, creating an originating call model, collecting originating dialed digits, requesting analysis of the digits, selecting trunk groups, creating a terminating call model, composing and sending messages to the terminating agent or party, detecting ISDN messages, detecting disconnect signals, and triggering enhanced services.

The call control function 212 communicates with SCAPI messages to trigger features and services from the service control function 214. The service control function 214 includes the switch service process which interfaces with the ISN components 116. The call control function 212 sends a SCAPI message to the service control function 214 to access data and processing from the service control function 214. The service control function 214 responds with a SCAPI response message to call control function 212 to provide the necessary information.

For example, if a caller desires to use a service that requires human operator intervention, call control function 212 will use the group select process and queue process to queue the call to an operator group with manual telephone operator consoles. A manual telephone operator console is a type of ISN component 116. The call is queued to the group of manual telephone operator consoles until a manual telephone operator console becomes available. The call is then connected through to the manual telephone operator console and processed. The manual telephone operator console processes the call by interfacing with other ISN components 116 and via LANs, WANs and routers (and other connectivity) 114. When processing by the manual telephone operator console is complete, if the caller desires connection with a receiving party, the switch controller connects the call through to the receiving party by sending commands to the switch controller 112 that are processed by the service control function 214, the call control function 212 to set up a terminating leg, and the programmable switch support function 210 to translate to programmable switch commands and acquire a terminating channel on programmable switch 110. If the caller does not desire connection with a receiving party, the caller is disconnected.

The resource control function 208 includes two processes. The first is the system control process, which is in charge of monitoring the states of a call and service-related resources. This system control process is centrally aware of the resource state and general health of the switch controller 112. The second is the resource management process. Exemplary switch controller resource management functionality includes management of both system-related resources such as message queues and a call data block table, as well as network resources such as the programmable switch matrices and agent resources. The resource management process is described in further detail in copending U.S. patent application, Ser. No. 09/096,939 entitled, "A System and Method for Resource Management" referenced above.

The service control function 214 provides an interface to the ISN 108 and one or more service logic programs that provide enhanced service call processing. The service control function 214 is made up of the switch service process, the group select process, call queuing process, and the other service logic processes that allow for network interface and enhanced service processing. In order to provide an interface to the ISN 108, the switch service process converts between SCAPI message format used by the switch controller 112 and NSPP used by ISN 108.

The use of service-specific service logic programs within the service control function enables service-specific features for each call. The call control function 212 performs service independent processing. The call control function communicates by sending SCAPI messages to service logic programs within the service control function 214 to trigger processing of the service logic program that provides features and/or services.

The group select service logic program routes calls to intelligent peripherals. Programmable switch 110 ports are grouped by the type and application of intelligent peripheral to which the port terminates. When a call requires a certain intelligent peripheral, the switch controller 112 selects the port group of that intelligent peripheral type, and send a command to the programmable switch 110 which routes the call to the first available port in that group. The group select service logic program selects a programmable switch 110 port group, to which to route a call, based on a dialed number translation and other business specific criteria such as the service selected by the caller.

The call queue service logic program queues calls on the programmable switch 110. The call queue service logic program determines the port group to which the call should be routed. If the call queue service logic program does not have ports available in a group, the call queue service logic program sends commands to the programmable switch 110 via the programmable switch support function 210 to queue the call which is to hold the call and perhaps apply treatment (i.e., play music). The call queue service logic program generates the commands needed to hold the call in queue on the programmable switch 110, apply call treatment, drop a call that has been held too long, and transfer a call.

Other service logic programs provide feature and/or service specific processing. In addition, service logic programs may perform processing for interface to other networks.

The management interface function 216 includes two functional areas of monitoring control. The system monitoring functionality encompasses the generation of system alarms which allows a system management console to monitor the status and run-time operation of the switch controller software. The management interface function 216 also includes a process manager, which is responsible for initial startup and health of individual processes that make up the switch controller 112.

Figure 3:
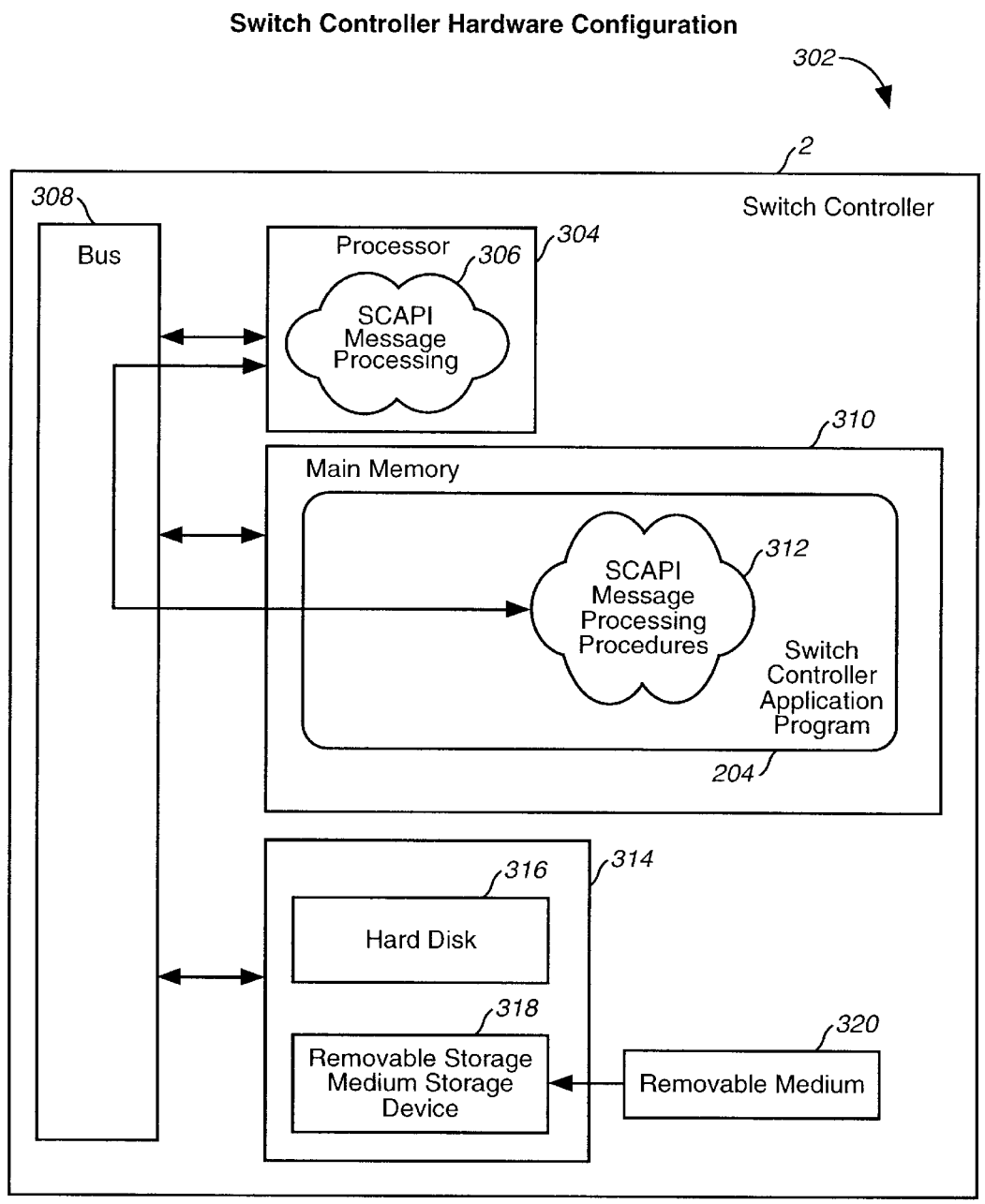
FIG. 3 is a block diagram of SCAPIs within the switch controller hardware configuration, according to one embodiment of the present invention.

The switch controller application program 204 of the present invention is preferably implemented using a computer system 302 as shown in block diagram form in FIG. 3. The computer system 302 includes one or more processors such as processor 304 connected to bus 308. Also connected to bus 308 is main memory 310 preferably random access memory (RAM) and secondary storage devices 314, secondary storage devices 314 include for example a hard drive 316 and a removable storage medium 320 such as a disk drive.

The switch controller application program 204 is preferably a computer program that resides in main memory 310 while executing. When executing, this computer program enables the computer system 302 to perform the features of the present invention as discussed here. Thus, the switch controller application program 204 represents the controller of the computer system 302 (and of the processor 304). Alternately, the switch controller application program 204 is predominantly or entirely a hardware device such as a hardware state machine.

In one exemplary embodiment, the present invention is a computer program product such as removable storage medium 320 representing a computer storage disk, compact disk etc., comprising a computer readable media having control logic recorded thereon. The control logic when loaded into main memory 310 and executed by processor 304 enables the processor 304 to perform operations herein. The switch controller application program 204 includes SCAPI message processing procedures 312 which are processed by the processor performing SCAPI message processing 306. The SCAPI message processing procedures 312 are procedures that are stored in main memory 310.

5.0 SCAPI Messages

Figure 4:
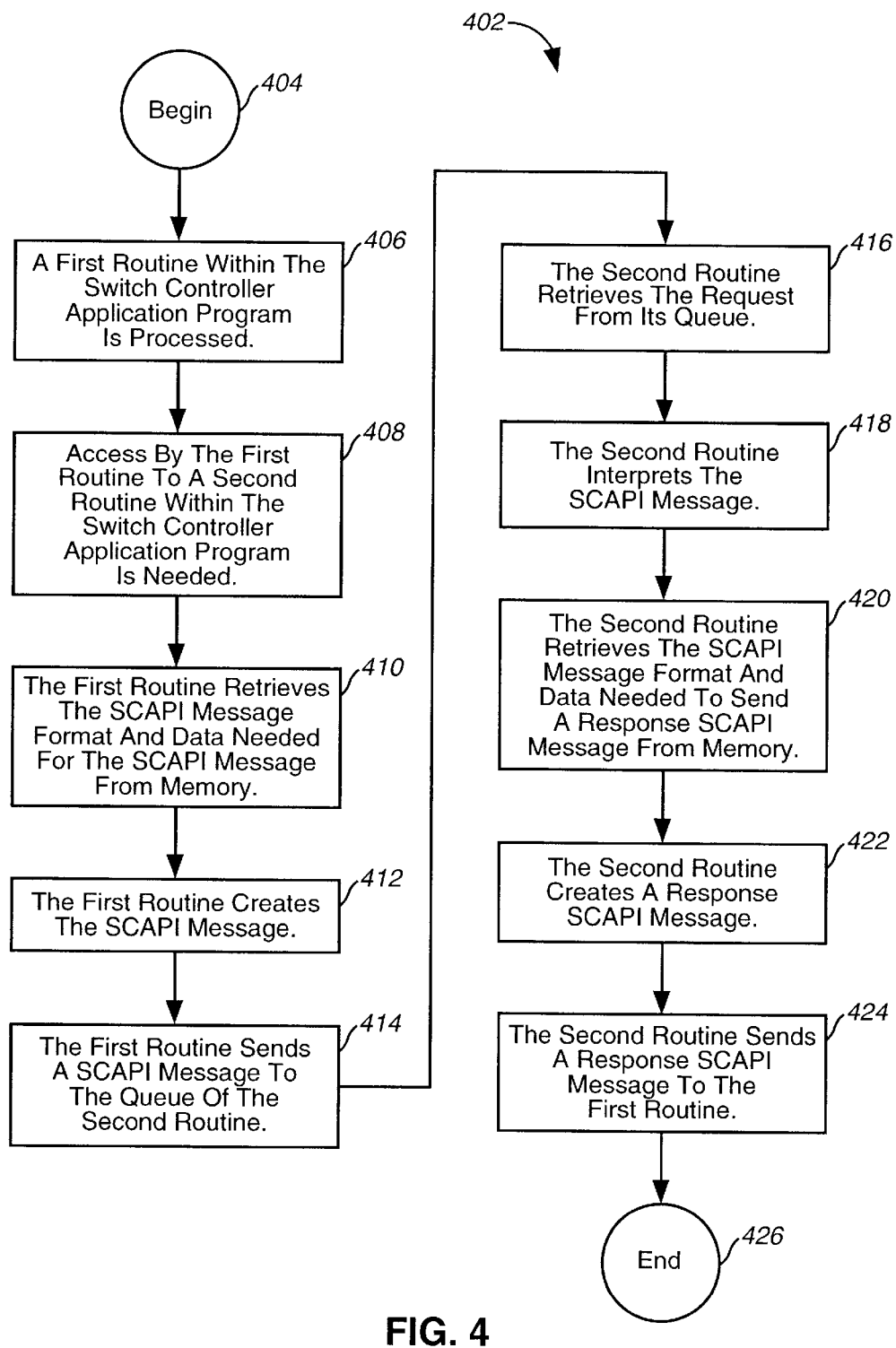
FIG. 4 is a flowchart of the operation of the SCAPI message process according to one embodiment of the present invention.

FIG. 4 illustrates the SCAPI message process flow 402. The SCAPI message process flow 402 is the flow of a SCAPI message transferring from one computer program routine to another computer program routine. The SCAPI message process flow 402 is given for an exemplary flow of a SCAPI message being sent from a first routine to a second routine within the switch controller application program 204.

With reference to FIG. 2, if the programmable switch support function 210 needs to send a SCAPI message to call control function 212, the programmable switch support function 210 is the first routine and the call control function 212 is the second routine or receiving routine. However, if the call control function 212 needs to send a SCAPI message to the service control function 214, the call control function 212 is the first routine and the service control function 214 is the second routine.

The SCAPI message process flow 402 begins with step 406. In step 406, the first routine within the switch controller application program 204 is processed. The software routines of the switch controller application program 204 including the programmable switch support function 210, the call control function 212, the resource control function 208, the service control function 214 and the management interface function 216, reside in main memory 310 and are processed by processor 304. One or more of these processes may be processed by processor 304 at any given time.

In step 408, the first routine needs to notify the second routine within the switch controller application program 204 that processing is needed. An example of processing needed by a routine is the call control function 212 needing processing performed by a service logic program within the service control function 214. The call control function 212 and service control function 214 operate together to perform call processing. The call control function 212 performs service independent call processing and the service control function 214 performs service specific processing. The call control function 212 receives a request for processing for a call and sends SCAPI messages to request processing by the service control function 214. One possible request for processing is a switch type SCAPI message received from the programmable switch support function 210 that was initiated by a programmable switch API message received from a programmable switch 110. An example of a call requiring processing of a service logic program is a call requiring a human operator. If a caller requests a service that requires a human operator, during processing of call control function 212, processing performed by the group select service logic program within the service control function 214 will be needed in order to connect the call through to a manual telephone operator console.

In step 410, the first routine retrieves the SCAPI message format and data needed for the SCAPI message from memory. In the previous hypothetical, if call control function 212 requires processing by service control function 214, the processor 304 executing the call control function 212 executes commands within the call control function 212 that retrieve the SCAPI message format and data needed for the SCAPI message residing in main memory 310. Alternately, the SCAPI message format and/or data needed for the SCAPI message may be in a secondary storage device 314 such as hard disk 316 or removable storage medium 320 or any other medium of storing data that can be used by a computer.

In step 412, the first routine creates the SCAPI message. The processor 304 executing SCAPI message processing procedures 312, either within call control function 212 or accessible by call control function 212, creates a SCAPI message. The format of the SCAPI message varies depending on the routine that sends the message and the purpose of the message. The formats of SCAPI messages will be described in further detail with respect to FIGS. 5 and 6.

In the exemplary hypothetical, in order to initiate processing of a service logic program, the call control function 212 sends a service type SCAPI message. Service SCAPI messages will be described in further detail with respect to FIGS. 5 and 6. As shown in Table 7 which is discussed with respect to FIG. 6D, service SCAPI messages have various fields including a service type field. One possible value of the service type field is SRV_TYPE_TRIGGER. The call control function 212 creates a service SCAPI message with the service type field having a value of SRV_TYPE_TRIGGER to initiate processing of a service logic program.

In step 414, the first routine sends a SCAPI message to the queue of the second routine. In the exemplary call above, the call control function 212 sends the SCAPI message to the service control function 214. Well-known UNIX interprocess communication (IPC) capabilities are used in transporting SCAPI messages. The call control function 212 writes a message to an IPC message queue corresponding to the service control function 214. The queued message contains a reference pointer to shared memory. The shared memory is dynamically allocated for use in storing actual message data. The call control function 212 writes the SCAPI message data to a shared memory segment that is allocated for the actual message data. The shared memory segment allocated for the actual message data is referenced by a pointer which is stored in the SCAPI message.

In step 416, the second routine retrieves the request from its IPC message queue. In order to retrieve the actual message data of the SCAPI message, the second routine retrieves the reference pointer from the IPC message queue which points to the shared memory segment that includes the actual message data. The actual message data is then retrieved from the shared memory segment.

In the previous hypothetical, in step 414, the service control function 214 received the SCAPI message from the call control function 212 comprising the reference pointer to the shared memory segment storing the actual SCAPI message data. The service control function 214 retrieves the SCAPI message from the IPC message queue. The service control function 214 uses the reference pointer to locate the shared memory segment comprising the actual message data and reads the actual message data from the shared memory segment.

In step 418, the second routine interprets the SCAPI message. In the exemplary hypothetical, the service control function 214 interprets the service SCAPI message using the values of the fields. The SRV_TYPE_TRIGGER value in the service type field indicates that the SCAPI message was sent to trigger processing of a service logic program. In the exemplary hypothetical of processing a service that requires a human operator, the group select service logic program will be processed.

In step 420, the second routine retrieves from memory the SCAPI message format and data needed to send a response SCAPI message. In the exemplary hypothetical, the service control function 214 retrieves the SCAPI message format needed to send the response SCAPI message. The data needed for the response SCAPI message is either data needed to identify the response SCAPI message, such as a call identifier, or data that resulted from processing of the SCAPI message, such as a group identifier identifying a group of manual operator ports.

Data needed to identify the message is stored in the shared memory segment referenced by the pointer stored in the SCAPI message. Memory used for storage of data that results from the processing of the SCAPI message depends the processing performed by the SCAPI message. Processing a SCAPI message may result in no data for the response SCAPI message. Alternately, processing of SCAPI message may result in the processing of additional SCAPI messages, additional other messages, such as programmable switch API messages, and/or computer program code. Data resulting from SCAPI message processing may be stored in shared memory referenced by a pointer in additional SCAPI messages or other messages that were processed or in other memory accessible by processing computer program code.

In step 422, the second routine creates the response SCAPI message. In the example, the processing of commands within the service control function 214 creates the response SCAPI message.

In step 424, the second routine sends the response SCAPI message to the first routine. In the example, service control function 214 sends a response SCAPI message to call control function 212.

Figure 5A:
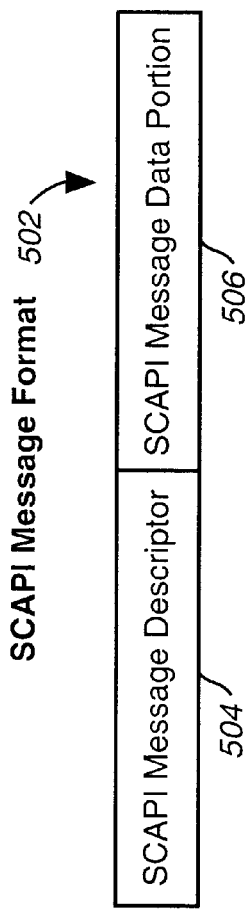
FIG. 5A is a diagram of the SCAPI message format according to one embodiment of the present invention.
Figure 5B:
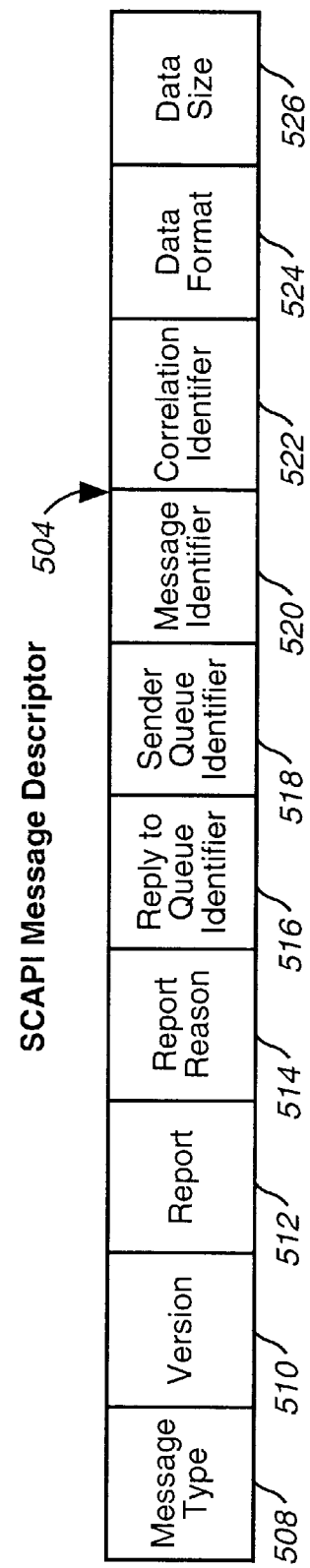
FIG. 5B is a diagram of the SCAPI message descriptor according to one embodiment of the present invention.

FIGS. 5A and 5B illustrate high-level SCAPI message formats. FIG. 5A is a diagram of the SCAPI message format 502. The SCAPI message format 502 includes the SCAPI message descriptor 504 and SCAPI message data 506. The SCAPI message descriptor 504 precedes SCAPI message data 506. The SCAPI message descriptor 504 will be described in further detail with respect to FIG. 5B. The SCAPI message data 506 will be described in further detail with respect to FIGS. 6A, 6B, 6C, and 6D.

FIG. 5B illustrates the SCAPI message descriptor 504. The SCAPI message descriptor 504 has information such as the message type and other information describing characteristics of the SCAPI message. The message descriptor 504 allows SCAPIs to process in a consistent manner for all SCAPI data types. In one exemplary embodiment, the SCAPI message descriptor 504 comprises 10 fields. These fields include the message type 508, the message version 510, the report field 512, report reason field 514, reply to queue identifier 516, sender queue identifier 518, message identifier 520, correlation identifier 522, data format 524, and data size 526.

Table 3 provides information about each of the fields of the message descriptor of the SCAPI message. Each row of Table 3 provides information about a particular message descriptor field.

The first column in Table 3 indicates the size of the field using well-known C syntax terminology. The next column in Table 3 is the field name which indicates which field is described by the information in the row. The field name corresponds to each of the field names shown in FIG. 5B. For example, the first row of Table 3 indicates the first field name is message type which corresponds to the message type 508 field of FIG. 5B. The third column of Table 3 provides a description of each of the fields. For example, referring to the third column of the first entry of Table 3, the function of the message type 508 field is to provide the type of the message. The fourth column provides the possible values for the field (which are possible message types). For the message type field 508, four possible values are given in Table 3: MT_REQUEST, MT_REPLY, MT_DATAGRAM, and MT_REPORT. The fifth column provides a description of the field values. Like the description of the field, the description of the field values describes a particular value. For example, for the MT_REQUEST value, the description is: "a message requiring a reply."

Therefore, if the message descriptor field has the value MT_REQUEST in the message type field 508, then the SCAPI message requires a reply.

The purpose of the message descriptor is to allow each of the switch controller message types to be described in a consistent manner for all switch message types. The message type field 508 identifies what type of message is being sent to ensure that any specialized handling that is needed for the type of message is performed. Message type is also a field in the SCAPI message data portion 506. The message type of the SCAPI message descriptor 504 is the same as the message type in the SCAPI message data portion 506.

The message version field 510 indicates the version of the message. Although version is also a field in the SCAPI message data segment 506, the value of the version field in the SCAPI message descriptor 504 differs from the value in the SCAPI message data 506.

The report field 512 indicates report options. This field indicates what type of report messaging is being requested by the sender of the message. The report option field indicates whether or not exception reports are required, and if so, which queue a report message should be sent to.

The report reason field 514 is populated with a reason code which indicates the nature of the report, which is particularly useful for MT_REPORT type messages. Reason codes can be either system or application related.

The reply to queue identifier field provides the message queue that should receive MT_REPLY and MT_REPORT messages. The sender queue identifier 518 field is the queue identifier of the process which sent the message. This identifier may be used by the receiving process to identify processes with problems and to log other information.

The message identifier field 520 provides message context information for the sender of the message and is returned in the correlation identifier field of any reply or report messages.

The correlation identifier field 522 is the correlation identifier of reply and report messages. The correlation identifier is used to match request messages with corresponding reply or report messages.

The data format field 524 indicates to the receiver what format the data part of the message is in. For example, it indicates whether the message has a data format of a registration message, heartbeat messages, switch message, or that no format is provided.

The data size field 526 is the size of the data buffer that follows the SCAPI message descriptor.

TABLE 3

Structure of the Message Descriptor of a SCAPI Message

| Short/ Long | Field Name | Field Description | Field Values Possible | Description Field Values |
|---|---|---|---|---|
| Short | sMsg Type | Message type of this message | MT_Request | This request message requires a reply. |
| | | | MT_Reply | This message is a reply to an earlier request message. This message should be sent to the queue indicated by the sReplyToQid field of the original request message. The CorrelId field of the reply message should be set to the message identifier field of the original request message. |

TABLE 3-continued

Structure of the Message Descriptor of a SCAPI Message

| Short/Long | Field Name | Field Description | Field Values Possible | Description Field Values |
|---|---|---|---|---|
| | | | MT_Datagram | This message does not require a reply. |
| | | | MT_Report | This message is a report message. This message reports an unexpected occurrence such as a request message that was received which contained data that was invalid. The report message should be sent to the queue indicated by the sReplyToQid field of the message descriptor of the message that caused the error. The usReportReason field should be set to indicate the nature of the report. In addition, the CorrelId field of the report message should be set to the message identifier field of the message that caused the error. It is possibie for a datagram message to initiate a report message. |
| Short | usVersion | Version of this Message Descriptor header format | MD_Version_1 | Version 1 of the Message Descriptor structure |
| UShort | usReport | This is the report options field. This field indicates what type of report messaging is being requested by the sender of the message. | MDRO_Exception | This value indicates that exception reports are required. This type of report can be sent by a process to indicate that a message that it has received cannot be processed (for example, the process could not parse the request message format or fields within the request message were corrupt or incorrect). Any report message will be sent to the queue specified in the sReplyToQid field. |
| | | | MDRO_Exception_SenderQid | This value also indicates that exception reports are required. This type of report is the same as the MDRO_Exception with the exception that any report messaging should be sent to the queue specified in the sSenderQid field. |
| | | | MDRO_None | This value indicates that no reports required. If a report message is requested, the queue to which the report should be sent must be specified in either the sReplyToQid or sSenderQid fields depending on the report type. When a report message is received, the nature of the report can be determined by examining the usReportReason field in the message descriptor. |
| UShort | usReportReason | This field indicates the nature of the report and is only meaningful for MT_REPORT type messages. Reason codes can be either system or application related. | RC_None RC_Invalid_MSG_Format | |

TABLE 3-continued

Structure of the Message Descriptor of a SCAPI Message

| Short/Long | Field Name | Field Description | Field Values Possible | Description Field Values |
|---|---|---|---|---|
| Short | sReplyToQid | This is the identifier of the message queue to which MT_REPLY and MT_REPORT messages should be sent to by the receiver of a request message. This field is required if a MT_REQUEST type message is specified in the message descriptor, or if any reports are requested with the sReport option in the message descriptor. | | For MT_DATAGRAM messages, the sReport option field must be set appropriately in order to have a MT_REPORT message sent to the originator of a MT_DATAGRAM message. If a reply-to-queue is not required, it is recommended that the sReplyToQid field be set to a negative value. |
| Short | sSenderQid | Queue identifier of process which sent the message. This is an identifier which can be used by receiving processes to identify misbehaving processes in error log information. | | |
| UShort | ulMsgId | This message identifier provides message context information for the sender of the message and should be returned in the Correction ID field of any corresponding reply or report message. | | |
| Ushort | ulCorrelID | The correlation identifier is set to the value of ulMsgID contained in the request message descriptor for reply or report messages. This allows a process to matchup an outstanding request message with a reply or report message. | | |
| Short | usData Format | This field indicates to the receiver what format the data part of the message is in. (Registration, HeartBeat, Switch, None, etc.) | | |
| Short | sData Size | This field indicates the size of the data buffer to follow. | | |

FIG. 6A illustrates the SCAPI switch message data portion. A switch type SCAPI message allows for communication between the programmable switch 110 and the switch controller 112. Switch SCAPIs are capable of initiating switch SCAPI messages that can initiate programmable switch APIs to send programmable switch APIs to the programmable switch 110. In addition, switch SCAPIs are capable of producing switch SCAPI messages in response to messages received by programmable switch APIs.

The SCAPI switch message data portion comprises ten fields. These fields include the message-type field 602, a version field 604, switch type 606, switch identifier 608, message option 610, context 612, status 614, data encoding 616, data format 618, and data size 620. Each of these fields is illustrated in more detail in Table 4. The left-most column of Table 4 indicates the field name. The next column indicates the length of the field. Like Table 3, Table 4 provides the size of the field using well known C programming language terminology. The third column provides the function of the field. The fourth column includes possible field values.

The information provided in Table 4 is described with reference to an exemplary field. The name of the field is in the first column of Table 4. The message type field 602 is the first entry of Table 4. The second column provides the size of the message type field 602 which is USHORT. The third column provides the function of the message type field 602. The message type 602 field indicates the type of message. The fourth column provides possible values of the message type field 602. The value of the message type field is MT_SWITCH_01, which is the same as the message type field 508 in the SCAPI message descriptor 504.

The information provided in Table 4 is further described with reference to a second exemplary field. The fifth entry of Table 4 provides information about the message options field 610 as indicated by the first column. The second column again provides the size of the field which for the message options field 610 is SHORT.

The third column indicates the function of the message options field 610 which is to indicate the switch message subtype. The message options field 610 indicates the function to be performed by the SCAPI message. Switch SCAPI messages allow for communication between the switch controller 112 and the programmable switch 110. Much of the communication between the switch controller 112 and the programmable switch 110 is to perform functions that affect connecting and disconnecting calls. The message options field 610 indicates functions such as whether the SCAPI message is sending data to connect channels, connect or release a conference call, indicate a call is being offered, park a call, or perform another function. A channel is the allocation of bandwidth in a data stream carried on a transmission facility for a particular call. A conference call is more than two parties connected on a call. A call is parked if the originating channel of the call is held without attempting to connect a terminating leg. Typically a call is parked to await additional signaling or the expiration of a timer.

The fourth column provides the possible values for the field. The possible values include message option connect outbound conference, message option connect outbound conference response, message option outbound release, message option outbound release response, message option call offered, message option call offered response, message option release, message option connect, message option conference, message option call park, message option observe, message option XL action, and message option XL protocol.

TABLE 4

Switch Message Parameters

| Field Name | Short/Long | Function | Possible Values |
| --- | --- | --- | --- |
| Message Type | USHORT | This field indicates the type of message that this header represents. The value should be the same value that is contained in the data format field of this message descriptor. | MT_SWITCH_01 |
| Version | USHORT | This is the version of the switch message header format. | SW_VER_1 |
| Switch Type | SHORT | This field indicates which type of switch matrix this message is intended for. | SW_TYPE_EXCEL_LNX<br>SW_TYPE_EXCEL_CSN<br>SW_TYPE_SUMA |
| Switch Identifier | SHORT | This field indicates which switch matrix or node should receive this message. This field can sensor the same purpose as the logical node field in the excel message header when communicating with Excel switches. | For Excel switches, this value should be in the range of 0 to 255. |
| Message Options | SHORT | This field indicates which switch message subtype is being used. | MSG_OPT_CONNECT_OB_CONF<br>MSG_OPT_CONNECT_OB_CONF_RSP<br>MSG_OPT_OB_RELEASE<br>MSG_OPT_OB_RELEASE_RSP<br>MSG_OPT_CALLOFFERED<br>MSG_OPT_CALLOFFERED_RSP<br>MSG_OPT_RELEASE<br>MSG_OPT_CONNECT<br>MSG_OPT_CONFERENCE<br>MSG_OPT_CALL_PARK<br>MSG_OPT_OBSERVE<br>MSG_OPT_XL_ACTION<br>MSG_OPT_XL_PROTOCOL |

TABLE 4-continued

Switch Message Parameters

| Field Name | Short/Long | Function | Possible Values |
|---|---|---|---|
| Context Information | LONG | This field contains context information used between applications. If this switch message is coming in from or going out to the Network Information Distribution System (NIDS) service logic layer, then this field contains the client handle of the NSPP (NIDS Sequenced Packet Protocol) client which originated or which will be receiving this message. | |
| Status Indicator | SHORT | This field is used to indicate status. This field can be use in both MT_REQUEST and MT_REPLY type SCAPI messages but is usually used in MT_REPLY type messages. | |
| Data Encoding | SHORT | This field specified the encoding of the data part of the message. | SW_ENC_NATIVE SW_ENC_ASNI SW_ENC_BIG_ENDIAN SW_ENC_LITTLE_ENDIAN |
| Data Format Identifier | USHORT | This field indicates to the receiver what format the data part of the message is in. For switch messages this field can be equal to all the ISNTC switch format types and all of the Excel switch message format types. | DF_SW_XL_ACTION DF_SW_XL_PROTOCOL |
| Data Size | SHORT | This field indicates the size of the data buffer to follow. | |

FIG. 6B illustrates the SCAPI registration message data portion. The registration SCAPI message is used by various processes to register themselves and provide health monitoring information. The routines within the switch controller application program 204, including the programmable switch support function 210, resource control function 208, call control function 210, management interface function 216, and service control function 214, send registration SCAPI messages to a process manager within the management interface function 214 so the process manager can monitor their health. Rather than sending heartbeats, as is traditionally done, the routines within the switch controller application program send registration SCAPI messages and the data within the registration SCAPI message is stored in a shared memory library that includes heartbeat data for the particular routine. The data is populated in the library is stored in shared memory, which is in main memory 310 or secondary storage device 316.

The SCAPI registration message data portion includes seven fields. These fields are: the message type field 622, the version field 624, the registration options field 626, the context field 628, the status field 630, the data format field 632, and the data size field 634. Table 5, below, provides additional information about these fields. In the left-most column of Table 5, the message name of the field is given. The second column includes the size of the field using well-known C programming language terminology. The third column provides the function of the field. The fourth column provides possible field values.

The information in Table 5 is explained with reference to an exemplary field. The message type field 622 is the first entry of Table 5 as indicated in the first column. The second column indicates the size of the message type field 622. The size of the message type field 622 is USHORT. The third column provides the function of the message type field 622. The function of the message type field 622 is to provide the type of message. The fifth column indicates the possible values of the message type field 622. The value of the message type field 622 is MT_REGISTRATION_01, which is the same as the message type field 508 of the SCAPI message descriptor 504 of the registration message.

The information provided in Table 5 is explained with reference to a second exemplary field. The third row of Table 5 provides information about the registration options field 626 of the SCAPI registration message data portion. The second column indicates the size of the registration options field 626. The size of the registration options field 626 is SHORT.

The fourth column indicates possible values of the registration options field 626. Possible values include REGOPT_HB_SHMEM (shared memory heartbeat indication) and REGOPT_HB_MSGQUE (IPC message-based heartbeat indication). Both of these values are used in registration SCAPI messages that are used to provide heartbeat information which indicates the health of a process.

TABLE 5

Switch Controller API Registration Message Parameters

| Message Name | Short/Long | Function | Possible Values |
| --- | --- | --- | --- |
| Message Type | USHORT | This field indicates the type of message that this header represents. The value should be the same as that contained in the data format field of the message descriptor that encapsulates this message. | MT_REGISTRATION_01 |
| Version | USHORT | This field indicates the version of the registration message header format. | REG_VERSION_1 |
| Registration Option | USHORT | This field is a bit mask which is used to indicate which registration option or options are being requested. | REGOPT_HB_SHMEM (Shared memory heart beat indication) REGOPT_HB_MSGQUE (IPC message based heart beat indication) |
| Content Information | SHORT | This field contains context information used between applications. This field can contain any type of information as long as the sending and receiving applications know the meaning. | |
| Status Indicator | USHORT | This field is used to indicate status information. This field can be used in both MT_REQUEST and MT_REPLY type SCAPI messages but is usually used in MT_REPLY type messages. | |
| Data Format Identifier | USHORT | This field indicates to the receiver what format the data part of the message is in. | |
| Data Size | SHORT | This field indicates the size of the data buffer to follow. | |

The third column indicates the function of the registration options field 626. The function of the registration options field 626 is to indicate which registration option or options are being requested. The registration options field 626 provides the function to be performed by the registration SCAPI message. The registration SCAPI message is used by the processes within the switch controller application program 204 to provide health monitoring information to the process manager with the management interface function 214.

FIG. 6C illustrates the SCAPI control message data portion. The control SCAPI message is used by processes to request another process to perform a task. For example, requests by a switch controller process to manage, obtain data from, or save data to a Simple Network Management Protocol (SNMP) agent are control messages. A SNMP agent is within the switch controller 112 and communicates with a System Management Console. The System Management Console can control the switch controller, using SNMP.

The SCAPI control message data portion includes seven fields: the message type field 636, the version field 638, operation code 640, context 642, status 644, data format 646, and data size 648. Each of these fields is illustrated in more detail in Table 6 below. The left-most column of Table 6 is the field name. The second column of Table 6 indicates the size of the field using well-known C programming language terminology. The third column of Table 6 provides the function of the field. The fourth column of Table 6 has possible field values and a description of the values.

The information provided in Table 6 is explained with reference to an exemplary field. The message type field 636 is the first entry of Table 6 as indicated in the first column. The size of the message type field 636 is USHORT as is shown in the second column. The third column indicates that the function of the message type field 636 is to provide the type of message. The fourth column provides the value of the message type field 636 is MT_CONTROL_01 which should be the same as the message type field 508 in the SCAPI message descriptor 504.

The information provided in Table 6 is explained with reference to a second exemplary field. The third row of Table 6 provides information about the operation code field 640 as is indicated in the first column. The second column provides the size of the operation code field 640 which is USHORT.

The third column provides the function of the operation code field 640. The function of the operation code field 640 as given in the third column is to indicate the type of control operation being requested. The operation code field 640 includes a value that determines the function performed by the control SCAPI message. Control SCAPI messages are used by processes to request other processes to perform tasks. Exemplary requests include requests to manage, obtain data from, or save data to the SNMP agent within the switch controller 112 that communicates with the System Management Console.

The fourth column provides the possible values of the operation code field 640. The possible values of the operation code field 640 are OC_SNMP_GET, OC_SNMP_SET, OC_SNMP_TEST, and OC_SHUTDOWN. The descriptions of the possible values are provided in the sixth column. For example, the OC_SNMP_GET value indicates an SNMP GET operation is being requested and, if successful, will result in the retrieving of the requested managed object value.

Switch Controller API Control Message Parameters

TABLE 6

| Parameter Name | Short/Long | Function | Possible Values and Description | |
|---|---|---|---|---|
| Message Type | USHORT | This field indicates the type of message that this header represents. The value should be the same that is contained in the data format field of the message descriptor. | MT_CONTROL_01 | |
| Version | USHORT | This field indicates the version of this control message header format. | CTRL_VERSION_1 | |
| Operation Code | USHORT | This field is used to indicate what type of control operation is being requested. | OC_SNMP_GET | This is on SNMP GET operation and if successful will result in the retrieving of the requested managed object value. This causes data to be read. |
| | | | OC_SNMP_SET | This is an SNMP SET operation and if successful will result in the setting of the managed object's value. This causes data to be saved. |
| | | | OC_SNMP_TEST | This is an SNMP TEST operation and if successful will result test whether a managed object is acceptable for a SNMP SET operation. |

TABLE 6-continued

| Parameter Name | Short/Long | Function | Possible Values and Description | |
|---|---|---|---|---|
| | | | OC_SHUTDOWN | This is a SHUTDOWN operation and is used to request an application to terminate. If successful the termination application process will send back a control message to the requesting process with the status field set to success. |
| Context | SHORT | This field contains context information used between applications. This field can contain any type of information as long as the sending and receiving application know the information to be sent and its meaning. | | |
| Status | SHORT | This field is used to indicate status information. This field can be used in both MT_REQUEST and MT_REPLY type SCAPI messages but is typically used in MT_REPLY type messages. | | |
| Data Format | USHORT | This field indicates to the receiver what format the data part of the message is. | DF_CTRL_SNMP_GET DF_CTRL_SNMP_SET DF_CTRL_SNMP_TEST | |
| Data Size | SHORT | This field indicates the size of the data buffer to follow. | | |

FIG. 6D illustrates the SCAPI service message data portion. The service SCAPI message requests call processing related services. In the hypothetical given with reference to FIG. 4, the SCAPI message sent from the call control function 212 to the service control function 214 to connect a caller to an available human operator is a service type SCAPI message because connecting a caller to a human operator is a call processing function. Service SCAPI messages perform tasks such as establishing and disconnecting channel connections, triggering a process to perform call processing functions, providing billing data, and providing network component availability data.

The SCAPI service message data portion includes 11 fields: the message type field 650, the version field 652, the service type field 654, the call identifier field 656, the agent terminal identifier field 658, the leg identifier field 660, the context field 662, the status field 664, the status qualifier field 666, the data format field 668, and the data size field 670. These fields are illustrated in further detail in Table 7. The left-most column indicates the field name. The second column indicates the size of the field using well-known C programming language terminology. The third column provides the function of the field. The fourth column provides possible field values and a description of the possible field values.

The information in Table 7 is explained with reference to an exemplary field. The message type field 650 is the first entry of Table 7. The second column indicates that the size of the message type field 650 is USHORT. The third column indicates that the function of the message type field 650 is to provide the type of message. The fourth column indicates that the message type field 650 value is MT_SERVICE_01 which should be the same as the message type field 508 in the SCAPI message descriptor 504 of the particular service message.

The information provided in Table 7 is explained with reference to a second exemplary field. The third row of Table 7 provides information about the service type field 654. The size of the service type field 654 as indicated in the second column is SHORT.

The function of the service type field 654 as indicated in the third column is to provide the type of service that is being requested. The value of the service type field 654 determines the function to be performed by the service SCAPI message. The service SCAPI message requests call processing related services. Service SCAPI messages perform tasks such as establishing and disconnecting channel connections, triggering a process to perform call processing functions, providing billing data, and providing network component availability data.

The fourth column provides the possible values of the service type field 654. The possible values of the service type field 654 are: SRV_TYPE_REL_CHANNEL, SRV_TYPE_REL_CHANNEL_RSP, SRV_TYPE_PARK_CHANNEL, SRV_TYPE_PARK_CHANNEL_RSP, SRV_TYPE_CREATE_LEG, SRV_TYPE_CREATE_LEG_RSP, SRV_TYPE_MERGE, SRV_TYPE_MERGE_RSP, SRV_TYPE_CONFERENCE_BRIDGE, SRV_TYPE_TRIGGER, SRV_TYPE_GROUP_SELECT, SRV_TYPE_NETWORK_ROUTE, SRV_TYPE_QUEUE, and SRV_TYPE_CONGESTION. The fifth column provides a description of the field values. For example, as shown in the fifth column, the SRV_TYPE_REL_CHANNEL and SRV_TYPE_REL_CHANNEL_RSP values indicate a service type used to release a channel.

The SCAPI service message data portion provides call identification information that identifies the call and elements of the call, such as the call legs. This data is provided in the call identifier field 656 and the leg identifier field 660 respectively. The thirteenth column provides information about the call identifier field 656. The fifteenth column provides information about the leg identifier field 660. The SCAPI service message data portion also provides telecommunications network component availability information. For example, the agent terminal identifier field 658 provides an identifier of an available agent, which is a manual telephone operator console or an ARU. The fourteenth column provides information about the agent terminal identifier field 658.

TABLE 7

Switch Controller API Service Message Parameters

| Field Name | Short/Long | Function | Possible Values and Description | |
|---|---|---|---|---|
| Message Type | USHORT | This field indicates the type of message that this header represents. The value should be the same value that is contained in the data format field of the message descriptor. | MT_SERVICE_01 | |
| Version | USHORT | This field indicates the version of this service message header format. | SRV_VERSION_1 | |
| Service Type | SHORT | This field is used to indicate what type of service is being requested. | SRV_TYPE_REL_CHANNEL | This service type is used to release a voice channel. |
| | | | SRV_TYPE_REL_CHANNEL_RSP | |
| | | | SRV_TYPE_PARK_CHANNEL | This service type is used to park a voice channel. |
| | | | SRV_TYPE_PARK_CHANNEL_RSP | |
| | | | SRV_TYPE_CREATE_LEG | This service type is used to create an outbound voice channel. |
| | | | SRV_TYPE_CREATE_LEG_RSP | |
| | | | SRV_TYPE_MERGE | This service request is used to merge two calls. |
| | | | SRV_TYPE_MERGE_RSP | |
| | | | SRV_TYPE_CONFERENCE_BRIDGE | This service type is used to conference multiple calls. |
| | | | SRV_TYPE_TRIGGER | This service type indicates a BCSM trigger notification. |

TABLE 7-continued

Switch Controller API Service Message Parameters

| Field Name | Short/Long | Function | Possible Values and Description | |
|---|---|---|---|---|
| | | | SRV_TYPE_GROUP_SELECT | This service type is used to request digit translation to an operator group number. |
| | | | SRV_TYPE_NETWORK_ROUTE | This service type is used to request digit translation to an outbound trunk group routing list. |
| | | | SRV_TYPE_QUEUE_CALL | This service type is used to queue a call that is destined for an operator position. |
| | | | SRV_TYPE_CONGESTION | This service type is used to indicate that a network congestion condition has been detected and needs attention. |
| Call Identifier | LONG | This field contains the call identifier for a particular call (which is also the call data block index). The call identifier identifies a particular call among the multiple calls handled by the switch controller 112. | | |
| Agent Terminal Identifier | LONG | This field contains the agent terminal identifier and is used to reference a particular agent. | | |
| BCSM Leg Identifier | SHORT | This field is used to reference one of two legs of a particular BCSM (basic call state machine). Each call has two legs. The first leg is the connection between the caller and the switch controller 112 which is the originating leg. The second leg is the connection between the switch controller 112 and the receiving party. Each of the legs has an identifier to distinguish the particular leg from other call legs being | LEG_ID_1 LEG_ID_2 | |

TABLE 7-continued

Switch Controller API Service Message Parameters

| Field Name | Short/Long | Function | Possible Values and Description |
|---|---|---|---|
| | | processed by switch controller 112. | |
| Context Information | SHORT | This field contains context information used between applications. This field can contain any type of information as long as the sending and receiving applications know its meaning. | |
| Status Indicator | SHORT | This field is used to indicate status information. This field can be used in both MT_REQUEST and MT_REPLY type SCAPI messages but is usually used in MT_REPLY type messages. | |
| Completion Code | SHORT | This field can be used as a qualifier for the status field. | |
| Data Format Identifier | USHORT | This field indicates to the receiver what format the data part of the message is in. | DF_SRV_PARK_CHANNEL<br>DF_SRV_MERGE<br>DF_SRV_REL_CHANNEL<br>DF_SRV_CONF BRIDGE |
| Data Size | SHORT | This field indicates the size of the data buffer to follow. | |

While various embodiments of the present invention have been described above, it should be understood that they have been presented by way of example only, not limitation. Thus, the breadth and scope of the present invention should not be limited by any of the above-described exemplary embodiments. It should be defined only in accordance with the following claims and their equivalents.

What is claimed is:

1. A computer, comprising:

a processor; and a communication means for enabling said processor to communicate one or more switch controller application programmer interface messages between a plurality of switch controller application program software routines, wherein each of said switch controller application programmer interface message is being used to contribute to providing an interface between a programmable switch and an intelligent service network component, said programmable switch interfacing with a public switched telephone network, wherein said switch controller application programmer interface messages include:

a switch message to perform a function associated with communication with said programmable switch;

a registration message to monitor the health of one or more of said switch controller application program software routines;

a control message for one of said plurality of switch controller application program software routines to request a second of said plurality of switch controller application program software routines to perform a task; and a service message to request that a call processing function be performed.

2. The computer of claim 1, wherein said switch message comprises:

a message type;

a message version;

a switch type;

a switch identifier;

a message options;

a context;

a status;

a data encoding;

a data format; and a data size.

3. The computer of claim 2, wherein said message options is one of:

switch message option call offered;

switch message option call offered response;

switch message option connect;
switch message option connect response;
switch message option release;
switch message option release response;
switch message option connect conference;
switch message option connect conference response;
switch message option outbound release;
switch message option outbound release response;
switch message option conference;
switch message option conference response;
switch message option call park;
switch message option call park response;
switch message option observe;
switch message option observe response;
switch message option play announcement;
switch message option attach DTMF;
switch message option detach DTMF;
switch message option protocol;
switch message option TC; and
switch message option action.

4. The computer of claim 1, wherein said registration message comprises:
a message type;
a message version;
a registration option;
a context;
a status;
a data format; and a data size.

5. The computer of claim 4, wherein said registration options is one of:
registration option shared memory heartbeat indication; and
registration option interprocess communication message based heartbeat indication.

6. The computer of claim 1, wherein said control message comprises:
a message type;
a message version;
an operation code;
a context;
a status;
a data format; and
a data size.

7. The computer of claim 6, wherein said operation code is one of:
control operation code SNMP get;
control operation code SNMP set;
control operation code SNMP test;
control operation code SNMP shutdown;
control operation code SNMP ready;
control operation code SNMP configuration;
control operation code SNMP debug on;
control operation code SNMP debug off; and
control operation code SNMP refresh.

8. The computer of claim 1, wherein said service message comprises:
a message type;
a message version type;
a service type;
a call identifier;
a terminal identifier;
a leg identifier;
a context;
a status;
a completion code;
a data format; and
a data size.

9. The computer of claim 8, wherein the service type is one of:
service type release channel;
service type release channel response;
service type park channel;
service type park channel response;
service type create leg;
service type create leg response;
service type merge;
service type merge response;
service type conference bridge;
service type conference bridge response;
service type trigger;
service type group select;
service type network route;
service type queue call;
service type congestion;
service type agent free;
service type service;
service type service response;
service type play announcement;
service type reorigination;
service type time point data;
service type prepaid billing; and
service type billing data.

10. The computer of claim 8, wherein said switch type is one of:
switch type excel LNX;
switch type excel CSN; or
switch type suma.

11. The computer of claim 8, wherein said data encoding is one of:
switch encoding native;
switch encoding ASN 1;
switch encoding big endian; or
switch encoding little endian.

12. The computer of claim 1, wherein said message comprises one or more fields, wherein one of said fields is a message type, wherein said message type is one of:
switch message;
registration message;
control message; or
service message.

13. The computer of claim 1, wherein said message comprises a data format, wherein said data format is one of:
data format switch XL action;
data format switch XL protocol;
data format control SNMP get;
data format control SNMP set;

data format control SNMP test;
data format service park channel;
data format service merge;
data format service release channel; or
data format service conference bridge.

14. The computer of claim 1, wherein said message comprises:
   a message descriptor; and
   a data portion;
   wherein said message descriptor comprises:
      a message descriptor message type;
      a message descriptor message version;
      a message descriptor report option;
      a message descriptor report reason;
      a message descriptor reply to queue identifier;
      a message descriptor sender queue identifier;
      a message identifier context;
      a correlation identifier;
      a data format; and
      a data size.

15. The computer of claim 1, wherein said communication means comprises:
   an application programmer interface means for creating said switch message; and
   a sending means for sending said switch message from a programmable switch support function.

16. The computer of claim 1, wherein said communication means comprises:
   an application programmer interface means for creating said service message; and
   a sending means for sending said service message from a first switch controller application program software routine of said plurality of switch controller application software routines; wherein said first switch controller application program software routine is one of:
      a call control function; or
      a service control function.

17. The computer of claim 1, wherein said communication means comprises:
   an application programmer interface means for creating said registration message; and
   a sending means for sending said registration message from a first switch controller application program software routine of said plurality of switch controller application software routines; wherein said first switch controller application program software routine is one of:
      a programmable switch support function;
      a resource control function;
      a management interface function;
      a call control function; or
      a service control function.

18. The computer of claim 1, wherein said communication means comprises:
   an application programmer interface means for creating said control message; and
   a sending means for sending said control message from a first switch controller application program software routine of said plurality of switch controller application software routines; wherein said first switch controller application program software routine is one of:
      a programmable switch support function;
      a resource control function;
      a management interface function;
      a call control function; or
      a service control function.

19. The computer of claim 1, wherein said switch controller application program software routines, comprise:
   a programmable switch support function capable of communicating with one or more programmable switch application programmer interface messages and said switch controller application programmer interface messages wherein said programmable switch support function interfaces between said programmable switch and said switch controller application programmer software routines; and
   a service control function capable of communicating with one or more transmission control messages and said switch controller application programmer interface messages wherein said service control function interfaces between said intelligent service network component and said switch controller application programmer software routines.

20. An intelligent service network, comprising:
   one or more programmable switches; and
   one or more computers, each computer being coupled to at least one of said one or more programmable switches, wherein each of said one or more computers comprises:
      a processor; and
      a communication means for enabling said processor to communicate one or more switch controller application programmer interface messages between a plurality of switch controller application program software routines, wherein each of said switch controller application programmer interface messages is being used to contribute to providing an interface between a programmable switch and an intelligent service network component, said programmable switch interfacing with a public switched telephone network, wherein said switch controller application programmer interface messages include:
         a switch message to perform a function associated with communication with said programmable switch;
         a registration message to monitor the health of one or more of said switch controller application program software routines;
         a control message for one of said plurality of switch controller application program software routines to request a second of said plurality of switch controller application program software routines to perform a task; and
         a service message to request that a call processing function be performed.

21. The intelligent service network of claim 20, further comprising:
   one or more intelligent service network components, wherein each of said one or more intelligent service network components is coupled to at least one of said one or more computers.

22. The intelligent service network of claim 21, further comprising:
   one or more external networks, wherein each of said one or more external networks is coupled to at least one of said one or more intelligent service network components.

23. The intelligent service network of claim 20, further comprising:
   a public switched telephone network coupled to each of said one or more programmable switches.

24. The intelligent service network of claim 23, further comprising:

one or more calling devices, wherein each of said one or more calling devices is coupled to said public switched telephone network.

25. A method for communication between software routines within one or more computer application programs to perform processing that contributes to providing an interface between a programmable switch coupled to a public switched telephone network and an intelligent service network component, comprising:

(a) retrieving by a first software routine a switch controller application programmer interface message format and data needed for a switch controller application programmer interface message from memory;

(b) creating said switch controller application programmer interface message; and (c) sending said switch controller application programmer interface message to a second software routine queue of a second software routine;

wherein said switch controller application programmer interface message is one of a plurality of switch controller application programmer interface messages including:

a switch message to perform a function associated with communication with said programmable switch;

a registration message to monitor the health of one or more of said switch controller application program software routines;

a control message for one of said plurality of switch controller application program software routines to request a second of said plurality of switch controller application program software routines to perform a task; and a service message to request that a call processing function be performed.

26. The method of claim 25, further comprising the steps of:

(d) retrieving by said second software routine said switch controller application programmer interface message from said second software routine queue;

(e) interpreting by said second software routine said switch controller application programmer interface message;

(f) retrieving by said second software routine a response switch controller application programmer interface message format and response data needed for a response switch controller application programmer interface message;

(g) creating said response switch controller application programmer interface message; and (h) sending by said second software routine said response switch controller application programmer interface message to said first software routine.

27. The method of claim 25, further comprising the following step to be performed before step (a):

receiving a programmable switch application programmer interface message from a programmable switch;

wherein said switch controller application programmer interface message is a switch type switch controller application programmer interface message, wherein said first software routine is a programmable switch support function; wherein said second software routine is a call control function.

28. The method of claim 27, further comprising the following steps:

(d) receiving said switch type switch controller application programmer interface message by said call control function;

(e) sending said service type switch controller application programmer interface message by said call control function;

(f) receiving said service type switch controller application programmer interface message by a service control function; and (g) sending a transmission control message by said service control function to the intelligent service network component.

29. The method of claim 25, further comprising:

(d) receiving said switch controller application programmer interface message; and (e) sending a non-switch controller application programmer interface message.

30. The method of claim 25, further comprising:

(d) receiving said switch controller application programmer interface message; and (e) sending a non-switch controller application programmer interface message, wherein said non switch controller application programmer interface message is one of:

a programmable switch application programmer interface message; or a transmission control message.

* * * * *